(12) United States Patent
Pike et al.

(10) Patent No.: US 11,494,333 B2
(45) Date of Patent: Nov. 8, 2022

(54) FILE TREE STRUCTURE

(71) Applicant: ADP, Inc., Roseland, NJ (US)

(72) Inventors: Yair Pike, New York, NY (US); Claire Casaregola, New York, NY (US); Lauren Miller, New York, NY (US); Harshita Daddala, New York, NY (US); Michael Greene, New York, NY (US)

(73) Assignee: ADP, Inc., Roseland, NJ (US)

( * ) Notice: Subject to any disclaimer, the term of this patent is extended or adjusted under 35 U.S.C. 154(b) by 0 days.

(21) Appl. No.: 17/109,352

(22) Filed: Dec. 2, 2020

(65) Prior Publication Data

US 2022/0171735 A1 Jun. 2, 2022

(51) Int. Cl.
*G06F 16/10* (2019.01)
*G06F 16/11* (2019.01)
*G06F 16/16* (2019.01)
*G06F 13/16* (2006.01)

(52) U.S. Cl.
CPC ........ *G06F 16/122* (2019.01); *G06F 13/1668* (2013.01); *G06F 16/16* (2019.01)

(58) Field of Classification Search
None
See application file for complete search history.

(56) References Cited

U.S. PATENT DOCUMENTS

| | | | |
|---|---|---|---|
| 5,903,902 A * | 5/1999 | Orr ...................... | G06F 40/103 715/202 |
| 9,547,478 B1 * | 1/2017 | Hale ................... | G06F 11/3668 |
| 2008/0134207 A1 * | 6/2008 | Chamieh .............. | G06F 9/4488 719/315 |

* cited by examiner

*Primary Examiner* — Belix M Ortiz Ditren
(74) *Attorney, Agent, or Firm* — Yee & Associates, P.C.

(57) ABSTRACT

A method for application development is provided. The method comprises receiving a number of documents, wherein each document represents a component of an application, and wherein a subset of the documents comprises overrides that link one component to another. A file tree structure is created for the application from the documents, wherein the file tree structure is organized according to component type. The documents are grouped according to component type and overrides, and the file tree structure is displayed to a user according to component type or according to a custom view specified by the user, wherein both views display the grouped documents and overrides among the documents.

26 Claims, 9 Drawing Sheets

FILE TREE STRUCTURE

BACKGROUND INFORMATION

1. Field

The present disclosure relates generally to an improved computer system and, in particular, to creating a file tree related to application development.

2. Background

Modern web browsers include suites of developer tools to test and debug code. These tools can be used for a range of functions such as inspecting loaded hypertext markup language (HTML), cascading style sheets (CSS), and JavaScript to showing assets the page has requested, how long those assets take to load, and network usage.

When working on application development, developers typically have each document related to an application component open in a separate browser tab of the software development tool. This separation of documents into separate tabs does not allow the developers to see how a particular document exists in the larger application on which they are working.

SUMMARY

An illustrative embodiment provides a computer-implemented method for application development. The method comprises receiving a number of documents, wherein each document represents a component of an application, and wherein a subset of the documents comprises overrides that link one component to another. A file tree structure is created for the application from the documents, wherein the file tree structure is organized according to component type. The documents are grouped according to component type and overrides, and the file tree structure is displayed to a user according to component type or according to a custom view specified by the user, wherein both views display the grouped documents and overrides among the documents.

Another illustrative embodiment provides a system for application development. The system comprises a bus system, a storage device connected to the bus system, wherein the storage device stores program instructions, and a number of processors connected to the bus system, wherein the number of processors execute the program instructions to: receive a number of documents, wherein each document represents a component of an application, and wherein a subset of the documents comprises overrides that link one component to another; create a file tree structure for the application from the documents, wherein the file tree structure is organized according to component type; group the documents according to component type and overrides; and display the file tree structure to a user according to component type or according to a custom view specified by the user, wherein both views display the grouped documents and overrides among the documents.

Another illustrative embodiment provides a computer program product for application development. The computer program product comprises a computer-readable storage medium having program instructions embodied thereon to perform the steps of: receiving a number of documents, wherein each document represents a component of an application, and wherein a subset of the documents comprises overrides that link one component to another; creating a file tree structure for the application from the documents, wherein the file tree structure is organized according to component type; grouping the documents according to component type and overrides; and displaying the file tree structure to a user according to component type or according to a custom view specified by the user, wherein both views display the grouped documents and overrides among the documents.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that developers typically have each document related to an application component open in a separate browser tab of the software development too. As a result, the developers do not have the ability to how or where a particular document operates in the larger application on which they are working.

The illustrative embodiments also recognize and take into account that developers do not have an easy way to search, find, and open documents while they are working. Without the ability to see a full list of documents while working, developers have to spend time navigating between browser tabs, looking for the documents on which they were working to make sure they are working on the right file types.

The illustrative embodiments provide a file tree structure that allows developers to view all their documents in an organized way. The developers can toggle between two different file tree views. The first view is by file type, wherein all files are organized automatically into folders according to document type, e.g., tile, logiflow, business rule, etc. The second view is customizable wherein the developers can create their own folders and sub-folders and add files to them according to their specific needs. In the custom view, developers can delete, create, rename, and move their documents and folders.

In both views, the documents are also grouped into "documents" and "overrides." An override is a document that lives in another application, but a developer has made changes to the document from a different application. Developers can also see if a document is in a draft state (i.e. the document is only saved locally).

Figure 1:
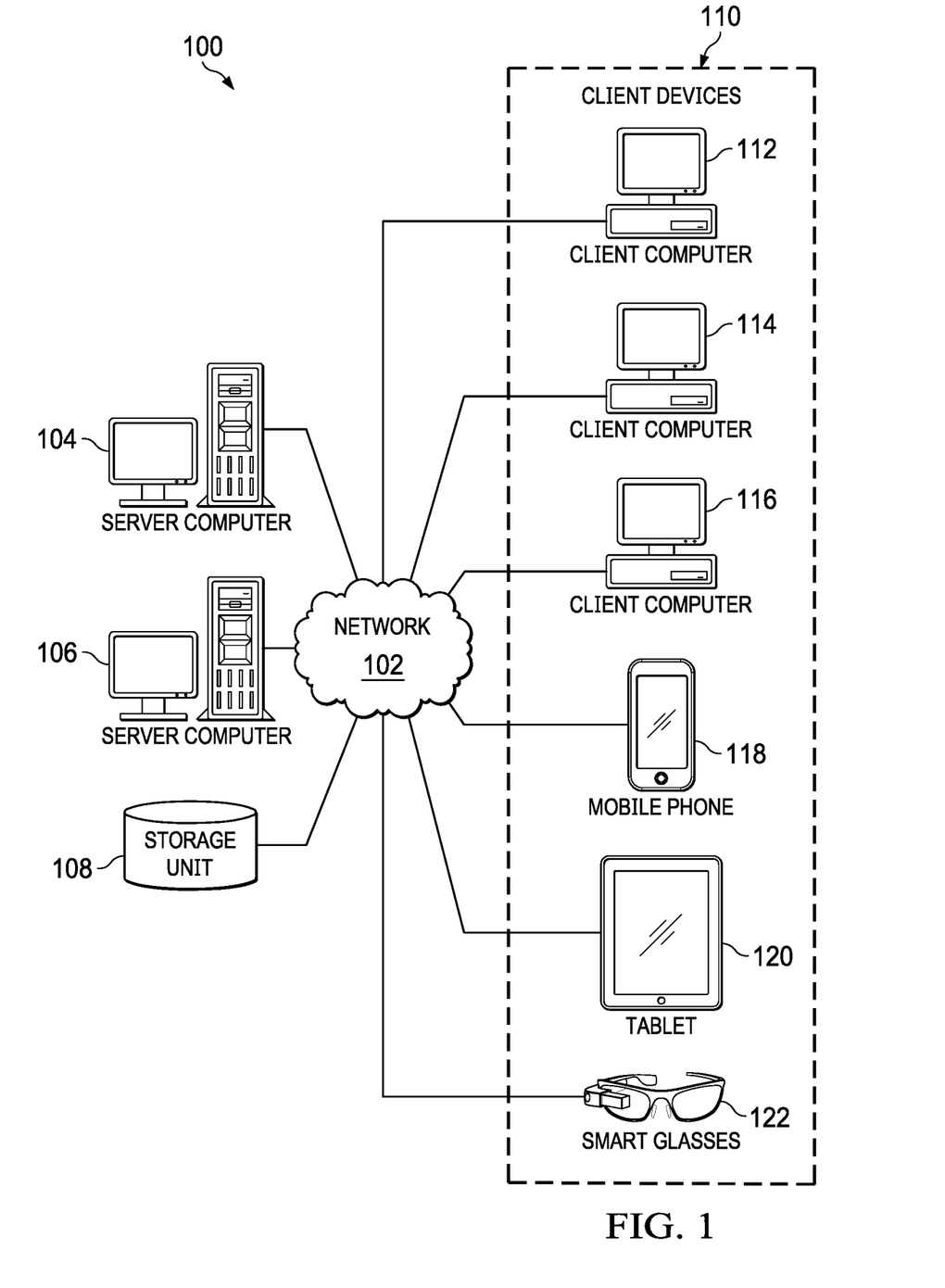
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
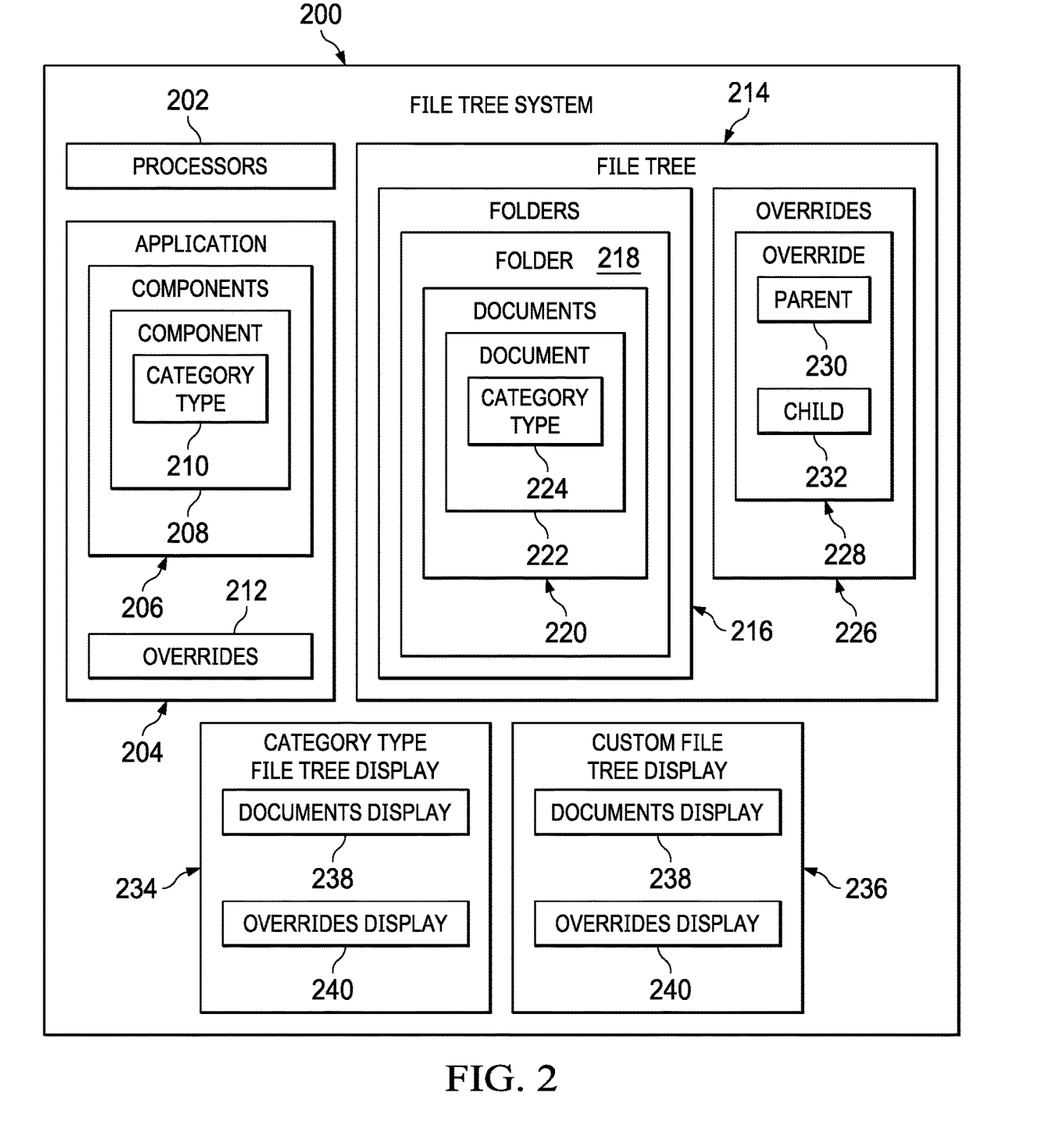
FIG. 2 is an illustration of a block diagram of a file tree system for application development in accordance with an illustrative embodiment.

Turning to FIG. 2, a block diagram of a file tree system for application development is depicted in accordance with an illustrative embodiment. File tree system 200 might be implemented in network data processing system 100 in FIG. 1.

File tree system 200 comprises a number of processors 202, application 204, and file tree 214.

Application 204 comprises a number of components 206. Each component 208 within components 206 has a specified category type 210 related to that component's functionality within application 204 (e.g., business rule, job definition, models, etc.). Application 204 might also comprise overrides 212, in which the operation of a component existing in one application is modified in when the components is accessed from another application, without changing the underlying coding of the component.

File tree 214 organizes the hierarchical structure of application 204. File tree 214 comprises a number of folders 216. Each folder 218 among folders 216 contains a number of documents (files) that represent components 206 of application 204. Each document 222 represents a component, e.g., component 208, of application 204 and has a category type 224 corresponding to the category type of the component it represents, e.g., category type 210.

File tree 214 also comprises override folders 226 representing overrides 212. Each override 228 is created by copying the contents of a first document (file) in file tree 214 into the contents of a second document in the file tree and linking the first documents as a parent file 230 to the second document as a child file 232.

File tree system 200 is able to toggle between two different displays of file tree 214: a category type display 234 and a custom display 236 created by a user. Both types of display 234, 236 group documents 220 into documents display 238 and an override display 240.

File tree system 200 can be implemented in software, hardware, firmware or a combination thereof. When software is used, the operations performed by file tree system 200 can be implemented in program code configured to run on hardware, such as a processor unit. When firmware is used, the operations performed by file tree system 200 can be implemented in program code and data and stored in persistent memory to run on a processor unit. When hardware is employed, the hardware may include circuits that operate to perform the operations in file tree system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein a processor is comprised of hardware circuits such as those on an integrated circuit that respond and process instructions and program code that operate a computer. When a number of processors execute instructions for a process, the number of processors is one or more processors can be on the same computer or on different computers. In other words, the process can be distributed between processors on the same or different computers in computer system. Further, the number of processors can be of the same type or different type of processors. For example, a number of processors can be selected from at least one of a single core processor, a dual-core processor, a multi-processor core, a general-purpose central processing unit (CPU), a graphics processing unit (GPU), a digital signal processor (DSP), or some other type or processor.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

FIGS. 3-6 illustrate examples of category type and custom displays in accordance with an illustrative embodiment.

Figure 3:
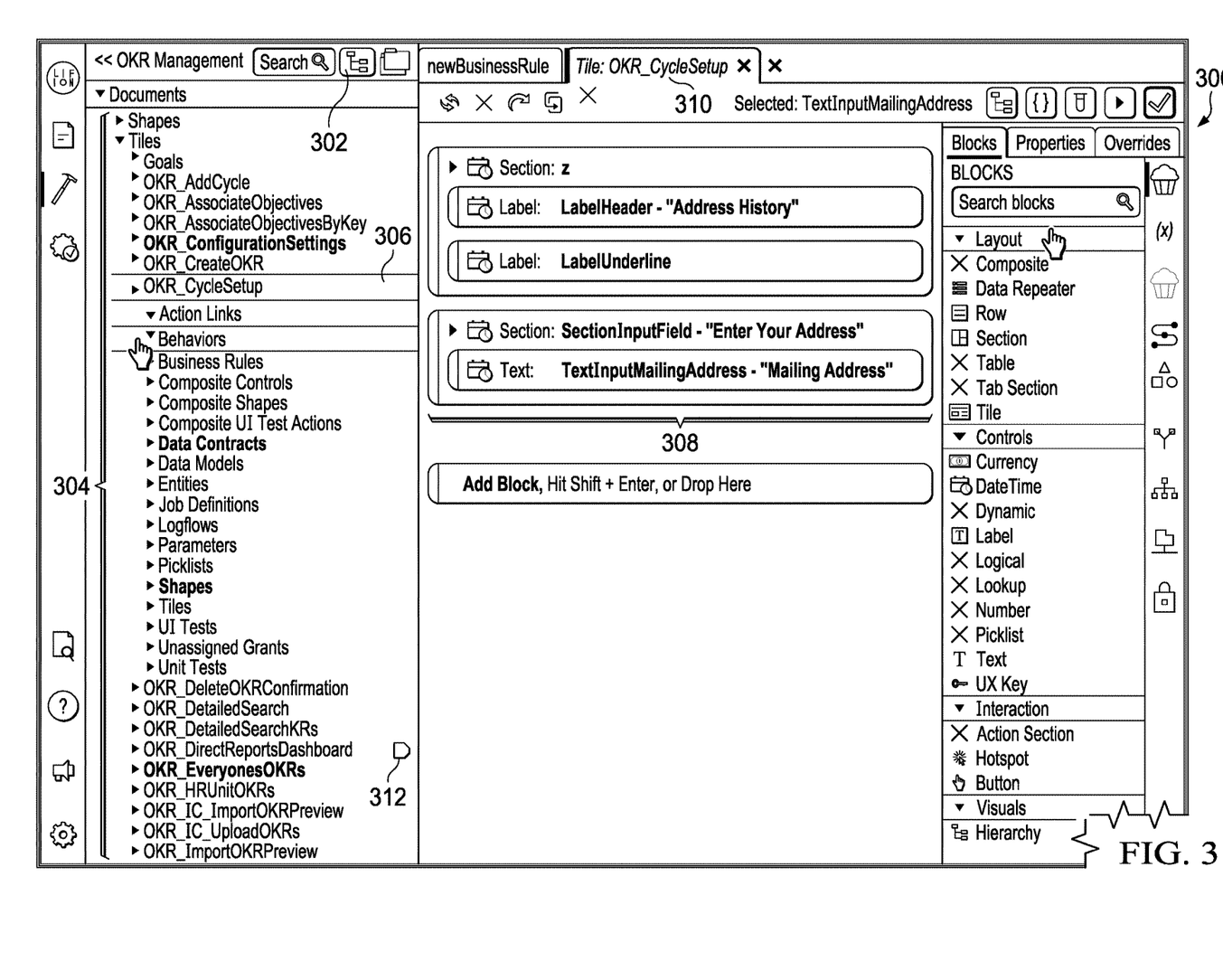
FIG. 3 is an illustration of a developer tool interface displaying a file tree by category type in accordance with an illustrative embodiment.

FIG. 3 is an illustration of a developer tool interface displaying a file tree by category type in accordance with an illustrative embodiment. Category type display 300 might be an example of category type file tree display 234 in FIG. 2. Category type display 300 is pulled up by toggling the category view selector button 302.

As shown, category display 300 organizes and displays documents 304 comprising the application according to their respective category types. Selecting a document, e.g., document 306, opens that document, allowing the user to see its components 308 in tab 310.

Different display options and symbols can be used to indicate the status of a given document. For example, symbol 312 indicates that a document is in draft form and is therefore saved only locally on the client device of the user. In the present example, the italics of the document title for tab 310 indicate that the user has not yet saved any changes to document 306. A designated color, e.g., green, might indicate a newly created document or folder with a newly created document in the file tree. Similarly, another color, e.g., orange, might indicate that a document or document in a folder has been modified or edited. The designated colors are arbitrary, but the underlying principle is to provide an easily identifiable quick visual indication to the user regarding the status of folders and documents in the file tree.

Figure 4:
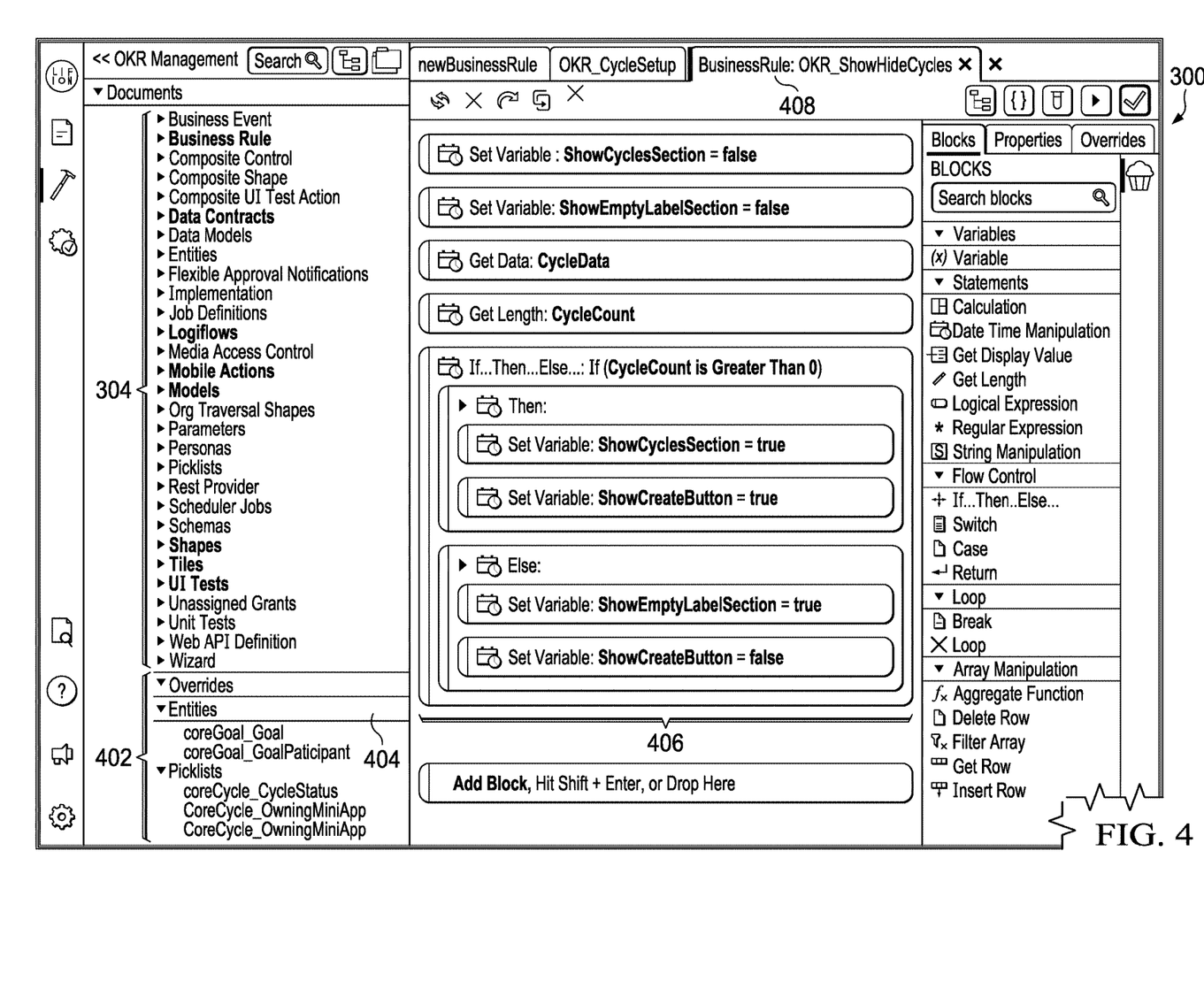
FIG. 4 is an illustration of a file tree display by category type showing overrides in the file tree in accordance with an illustrative embodiment.

FIG. 4 is an illustration of a file tree display by category type showing overrides in the file tree in accordance with an illustrative embodiment. In addition to displaying document according to category types 304, display 300 also display overrides 402 in the file tree. When the user selects an override, e.g., override document 404, the components 406 of the override are displayed in tab 408.

Figure 5:
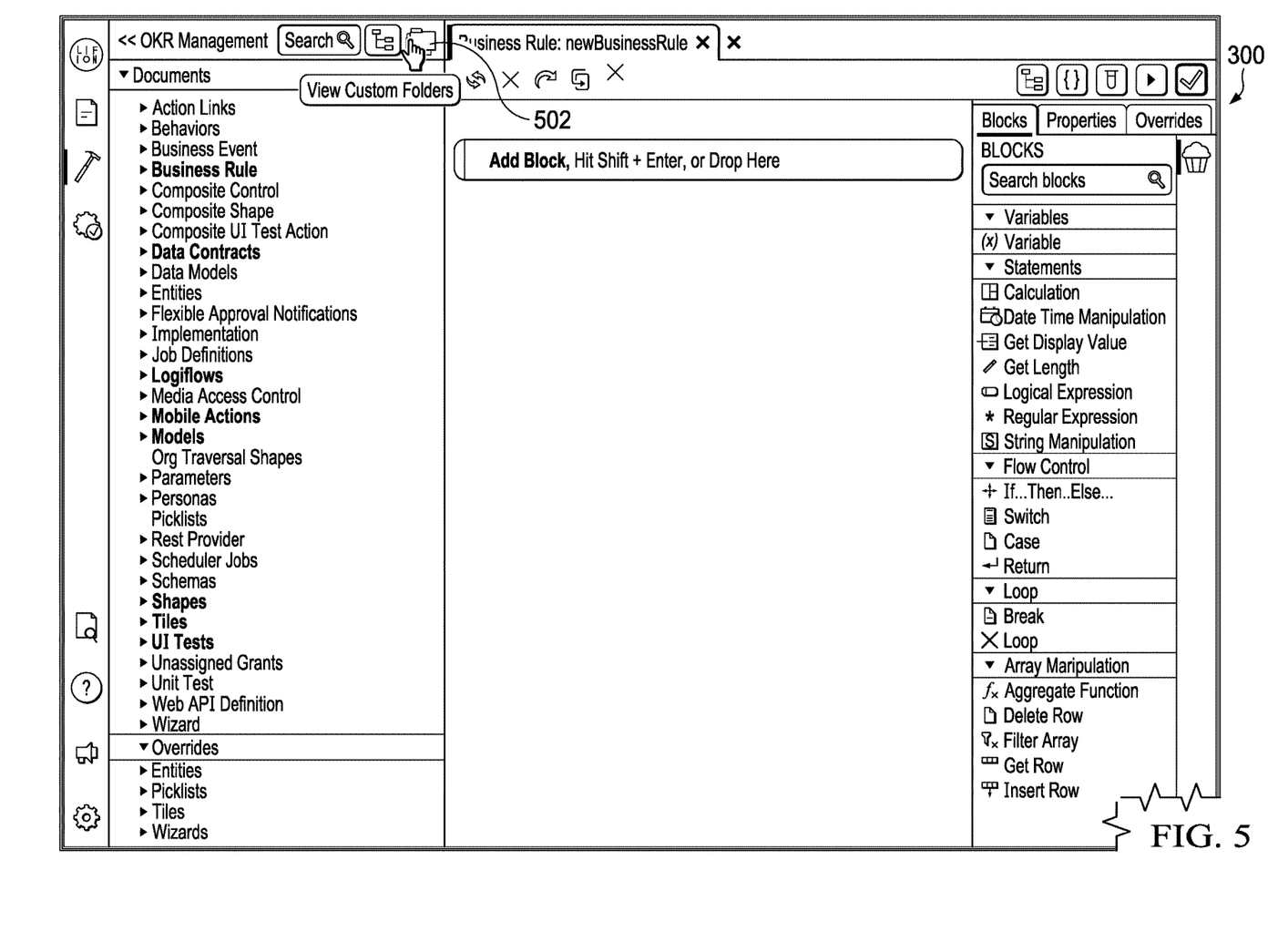
FIG. 5 depicts toggling to a custom file tree display in accordance with an illustrative embodiment.

FIG. 5 depicts toggling to a custom file tree display in accordance with an illustrative embodiment. To switch to a custom file tree display, the user selects custom view selector button 502.

Figure 6:
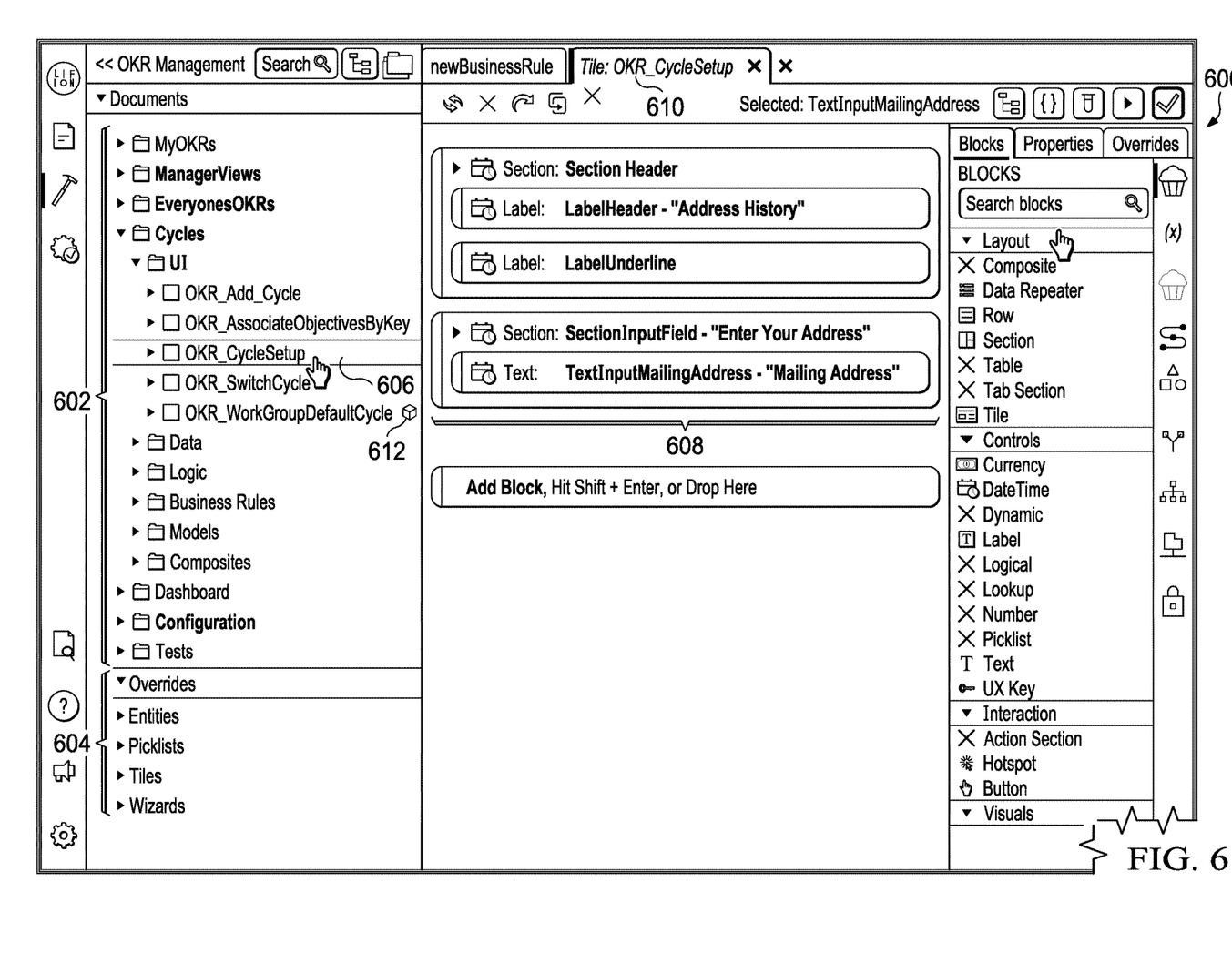
FIG. 6 is an illustration of a developer tool interface with a custom file tree structure display in accordance with an illustrative embodiment.

FIG. 6 is an illustration of a developer tool interface with a custom file tree structure display in accordance with an illustrative embodiment. Similar to category type display 300, custom file tree display 600 comprises both a display of documents 602 and a display of overrides 604. However, in custom display 600, the arrangement of documents 602 is customized according to the user's specific needs and preferences.

Selecting a document, e.g., document 606, opens the documents, thereby displaying its components 608 in tab 610. Custom display 600 might use the same display options as category type display 300 to indicate qualities such as new and modified documents, drafts, etc. In the present example, document display 602 also includes override indicator 612, to indicate an override in the file tree.

Figure 7:
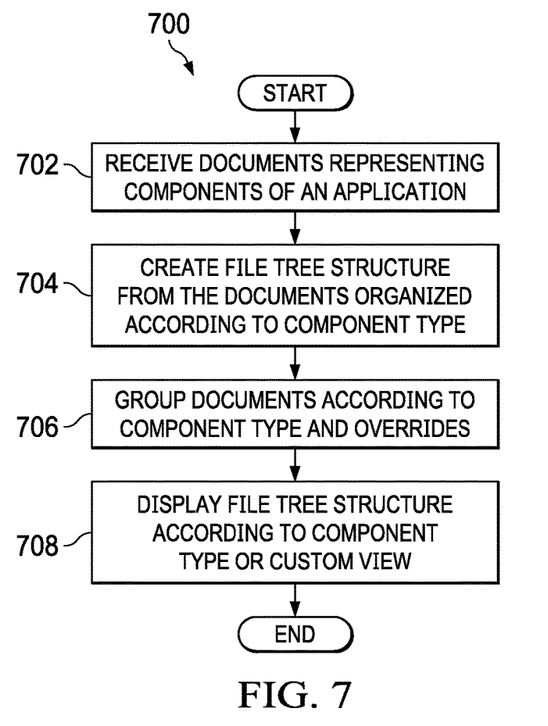
FIG. 7 depicts a flowchart for a process of creating a file tree structure in accordance with an illustrative embodiment.

FIG. 7 depicts a flowchart for a process of creating a file tree structure in accordance with an illustrative embodiment. The process in FIG. 7 can be implemented in hardware, software, or both. When implemented in software, the process can take the form of program code that is run by one of more processor units located in one or more hardware devices in one or more computer systems. Process 700 might be implemented in file tree system 200 shown in FIG. 2.

Process 700 begins by receiving a number of documents, wherein each document represents a component of an application (step 702). A subset of the documents comprises overrides that link one component to another.

A file tree structure for the application is created from the documents (step 704). The file tree structure is organized according to component type. The documents are according to component category type and overrides (step 706).

The file tree structure is displayed to a user according to component type or according to a custom view specified by the user, wherein both views display the documents and overrides among the documents (step 708). Process 700 then ends.

Figure 8:
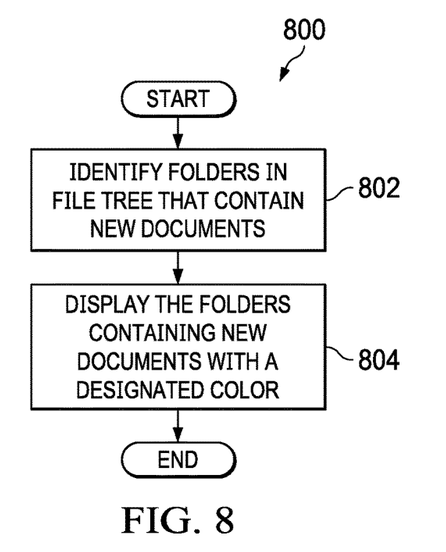
FIG. 8 depicts a flowchart for a process of indicating folder with new documents in accordance with an illustrative embodiment.

FIG. 8 depicts a flowchart for a process of indicating folder with new documents in accordance with an illustrative embodiment. Process 800 might be an additional process within step 708 in FIG. 7.

Process 800 identifies folders in the file tree that contain new documents created between a previous user access to the system and a current user access to the system (step 802), and displays the folders containing the new documents with a designated color (step 804).

Figure 9:
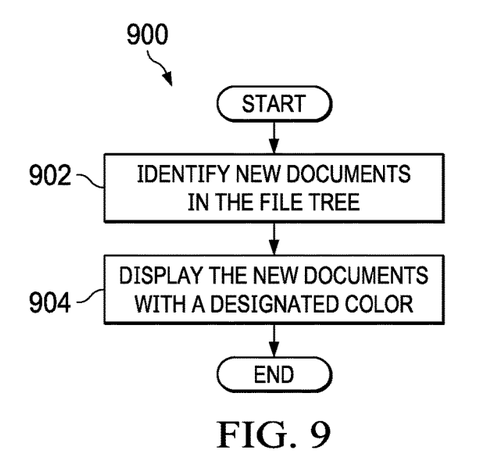
FIG. 9 depicts a flowchart for a process of indicating new documents in accordance with an illustrative embodiment.

FIG. 9 depicts a flowchart for a process of indicating new documents in accordance with an illustrative embodiment. Process 900 might be an additional process within step 708 in FIG. 7.

Process 900 identifies new documents in the file tree that have been created between previous user access to the system and a current user access to the system (step 902), and displays the new documents with a designated color (step 904).

Figure 10:
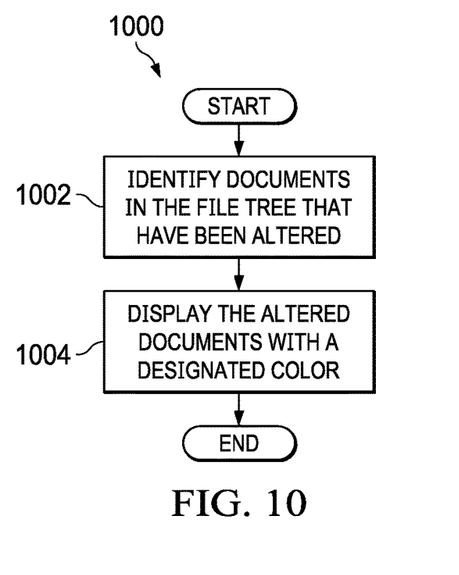
FIG. 10 depicts a flowchart for a process of indicating altered documents in accordance with an illustrative embodiment.

FIG. 10 depicts a flowchart for a process of indicating altered documents in accordance with an illustrative embodiment. Process 1000 might be an additional process within step 708 in FIG. 7.

Process 1000 identifies documents in the file tree that have been altered (modified, edited) between a previous user access to the system and a current user access to the system (step 1002), and displaying the altered documents with a designated color (step 1004).

Figure 11:
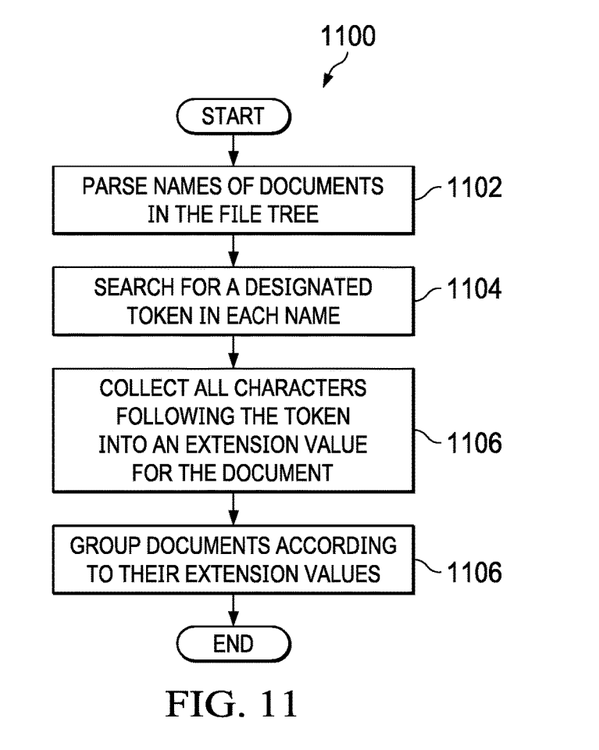
FIG. 11 depicts a flowchart for a process of grouping documents in accordance with an illustrative embodiment.

FIG. 11 depicts a flowchart for a process of grouping documents in accordance with an illustrative embodiment. Process 1100 might be an additional process within step 704 in FIG. 7.

Process 1100 begins by parsing names of the documents in the file tree (step 1102), then searching for a designated token in each name (step 1104).

For each document, all characters following the token in the name are collected into an extension value for the document (step 1106). The documents are then grouped in the file tree according to their respective extension values (step 1108).

Figure 12:
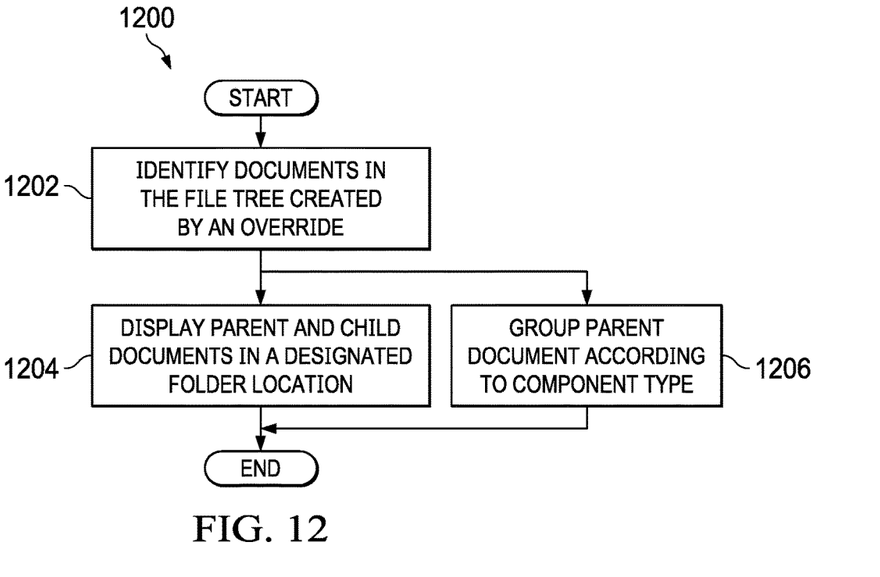
FIG. 12 depicts a flowchart for a process of indicating overrides in the file tree structure in accordance with an illustrative embodiment.

FIG. 12 depicts a flowchart for a process of indicating overrides in the file tree structure in accordance with an illustrative embodiment. Process 1200 might be an additional process within step 708 in FIG. 7.

Process 1200 identifies documents in the file tree created by an override, wherein the override copies contents of a parent document in the file tree into a child document in the file tree (step 1202), displays the parent document and child document in a designated folder location (step 1204), and also groups the parent document by component type along with the other non-override documents (step 1206).

Figure 13:
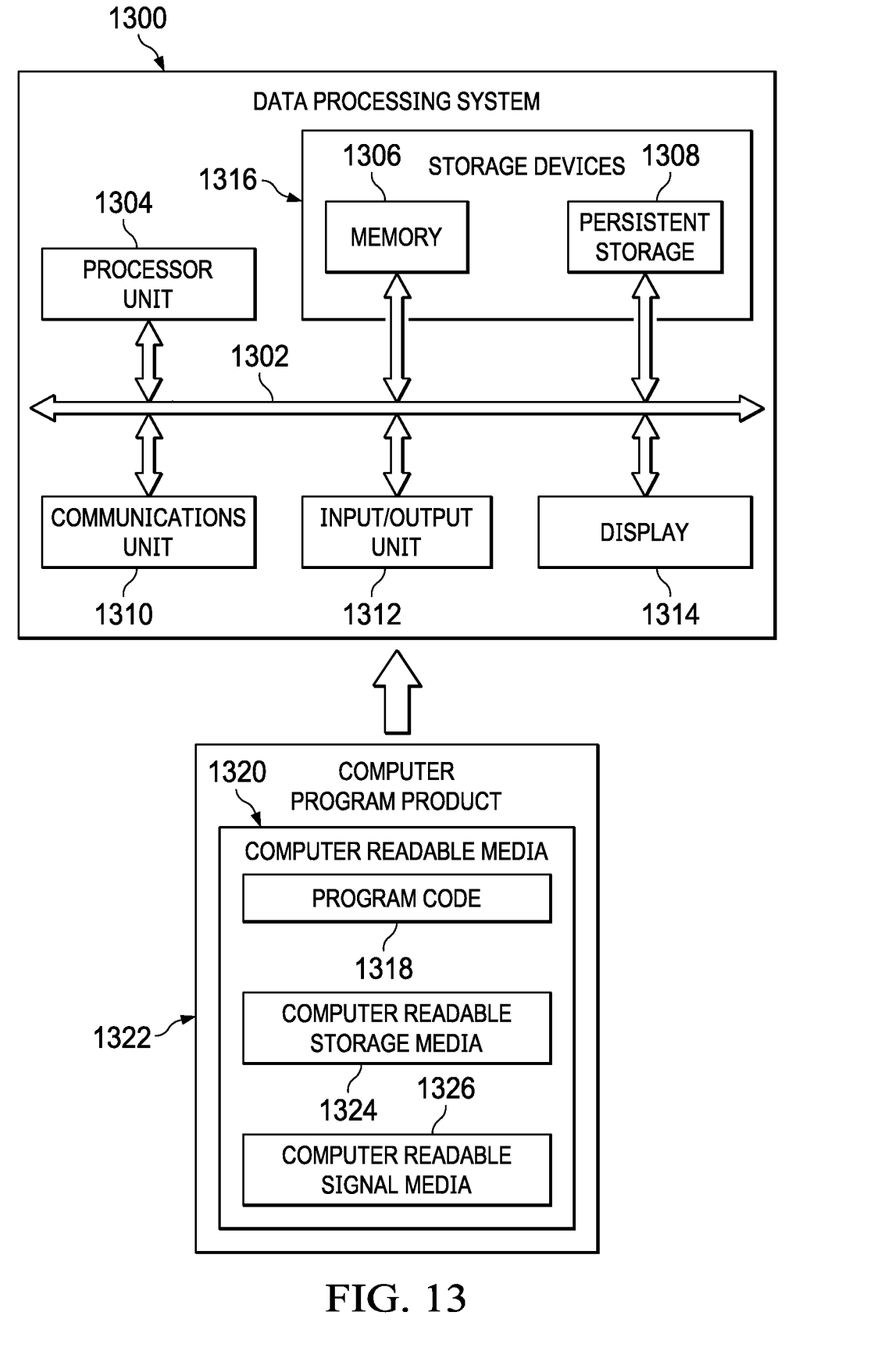
FIG. 13 is an illustration of a block diagram of a data processing system in accordance with an illustrative embodiment.

Turning now to FIG. 13, an illustration of a block diagram of a data processing system is depicted in accordance with an illustrative embodiment. Data processing system 1300 may be used to implement one or more computers shown in FIG. 1 (e.g., client devices 110 and server computers 104, 106) and file tree system 200 in FIG. 2. In this illustrative example, data processing system 1300 includes communications framework 1302, which provides communications between processor unit 1304, memory 1306, persistent storage 1308, communications unit 1310, input/output unit 1312, and display 1314. In this example, communications framework 1302 may take the form of a bus system.

Processor unit 1304 serves to execute instructions for software that may be loaded into memory 1306. Processor unit 1304 may be a number of processors, a multi-processor core, or some other type of processor, depending on the particular implementation. In an embodiment, processor unit 1304 comprises one or more conventional general-purpose central processing units (CPUs). In an alternate embodiment, processor unit 1304 comprises one or more graphical processing units (CPUs).

Memory 1306 and persistent storage 1308 are examples of storage devices 1316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1316 may also be referred to as computer-readable storage devices in these illustrative examples. Memory 1316, in these examples, may be, for example, a random access memory or any other suitable volatile or non-volatile storage device. Persistent storage 1308 may take various forms, depending on the particular implementation.

For example, persistent storage 1308 may contain one or more components or devices. For example, persistent storage 1308 may be a hard drive, a flash memory, a rewritable optical disk, a rewritable magnetic tape, or some combination of the above. The media used by persistent storage 1308 also may be removable. For example, a removable hard drive may be used for persistent storage 1308. Communications unit 1310, in these illustrative examples, provides for communications with other data processing systems or devices. In these illustrative examples, communications unit 1310 is a network interface card.

Input/output unit 1312 allows for input and output of data with other devices that may be connected to data processing system 1300. For example, input/output unit 1312 may provide a connection for user input through at least one of a keyboard, a mouse, or some other suitable input device. Further, input/output unit 1312 may send output to a printer. Display 1314 provides a mechanism to display information to a user.

Instructions for at least one of the operating system, applications, or programs may be located in storage devices 1316, which are in communication with processor unit 1304 through communications framework 1302. The processes of the different embodiments may be performed by processor unit 1304 using computer-implemented instructions, which may be located in a memory, such as memory 1306.

These instructions are referred to as program code, computer-usable program code, or computer-readable program code that may be read and executed by a processor in processor unit 1304. The program code in the different embodiments may be embodied on different physical or computer-readable storage media, such as memory 1306 or persistent storage 1308.

Program code 1318 is located in a functional form on computer-readable media 1320 that is selectively removable and may be loaded onto or transferred to data processing system 1300 for execution by processor unit 1304. Program code 1318 and computer-readable media 1320 form computer program product 1322 in these illustrative examples. In one example, computer-readable media 1320 may be computer-readable storage media 1324 or computer-readable signal media 1326.

In these illustrative examples, computer-readable storage media 1324 is a physical or tangible storage device used to store program code 1318 rather than a medium that propagates or transmits program code 1318. Computer readable storage media 1324, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1318 may be transferred to data processing system 1300 using computer-readable signal media 1326. Computer-readable signal media 1326 may be, for example, a propagated data signal containing program code 1318. For example, computer-readable signal media 1326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown. The different embodiments may be implemented using any hardware device or system capable of running program code 1318.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of application development, the method comprising:
    using a number of processors to perform the steps of:
        receiving a number of documents, wherein each document represents a component of an application, and wherein a subset of the documents comprises overrides that link one component to another;
        creating a file tree structure for the application from the documents, wherein the file tree structure is organized according to component type;
        grouping the documents according to component type and overrides;
    displaying the file tree structure to a user according to component type or according to a custom view specified by the user, wherein both views display the grouped documents and overrides among the documents;
    parsing names of the documents in the file tree;
    searching for a designated token in each name;
    for each document, collecting all characters following the token in the name into an extension value for the document; and
        grouping the documents in the file tree according to their respective extension values.

2. The method of claim 1, further comprising:
    identifying folders in the file tree that contain new documents created between a previous user access to the system and a current user access to the system; and
    displaying the folders containing the new documents with a designated color.

3. The method of claim 1, further comprising:
    identifying new documents in the file tree that have been created between previous user access to the system and a current user access to the system; and
    displaying the new documents with a designated color.

4. The method of claim 1, further comprising:
    identifying documents in the file tree that have been altered between a previous user access to the system and a current user access to the system; and
    displaying the altered documents with a designated color.

5. The method of claim 1, further comprising grouping the documents in the file tree according to their names.

6. A computer-implemented method of application development, the method comprising:
    using a number of processors to perform the steps of:
        receiving a number of documents, wherein each document represents a component of an application, and wherein a subset of the documents comprises overrides that link one component to another;
creating a file tree structure for the application from the documents, wherein the file tree structure is organized according to component type;
grouping the documents according to component type and overrides;
displaying the file tree structure to a user according to component type or according to a custom view specified by the user, wherein both views display the grouped documents and overrides among the documents;
identifying documents in the file tree created by an override, wherein the override copies contents of a parent document in the file tree into a child document in the file tree;
displaying the parent document and child document in a designated folder location; and
grouping the parent document according to component type.

7. A system for application development, the system comprising:
a bus system;
a storage device connected to the bus system, wherein the storage device stores program instructions; and
a number of processors connected to the bus system, wherein the number of processors execute the program instructions to:
receive a number of documents, wherein each document represents a component of an application, and wherein a subset of the documents comprises overrides that link one component to another;
create a file tree structure for the application from the documents, wherein the file tree structure is organized according to component type;
group the documents according to component type and overrides;
display the file tree structure to a user according to component type or according to a custom view specified by the user, wherein both views display the grouped documents and overrides among the documents;
parse names of the documents in the file tree;
search for a designated token in each name;
for each document, collect all characters following the token in the name into an extension value for the document; and
group the documents in the file tree according to their respective extension values.

8. The system of claim 7, wherein the processors further execute instructions to:
identify folders in the file tree that contain new documents created between a previous user access to the system and a current user access to the system; and
display the folders containing the new documents with a designated color.

9. The system of claim 7, wherein the processors further execute instructions to:
identify new documents in the file tree that have been created between previous user access to the system and a current user access to the system; and
display the new documents with a designated color.

10. The system of claim 7, wherein the processors further execute instructions to:
identify documents in the file tree that have been altered between a previous user access to the system and a current user access to the system; and
display the altered documents with a designated color.

11. The system of claim 7, wherein the processors further execute instructions to group the documents in the file tree according to their names.

12. A system for application development, the system comprising:
a bus system;
a storage device connected to the bus system, wherein the storage device stores program instructions; and
a number of processors connected to the bus system, wherein the number of processors execute the program instructions to:
receive a number of documents, wherein each document represents a component of an application, and wherein a subset of the documents comprises overrides that link one component to another;
create a file tree structure for the application from the documents, wherein the file tree structure is organized according to component type;
group the documents according to component type and overrides;
display the file tree structure to a user according to component type or according to a custom view specified by the user, wherein both views display the grouped documents and overrides among the documents;
identify documents in the file tree created by an override, wherein the override copies contents of a parent document in the file tree into a child document in the file tree;
display the parent document and child document in a designated folder location; and
group the parent document according to component type.

13. A computer program product for application development, the computer program product comprising:
a computer-readable storage medium having program instructions embodied thereon to perform the steps of:
receiving a number of documents, wherein each document represents a component of an application, and wherein a subset of the documents comprises overrides that link one component to another;
creating a file tree structure for the application from the documents, wherein the file tree structure is organized according to component type;
grouping the documents according to component type and overrides;
displaying the file tree structure to a user according to component type or according to a custom view specified by the user, wherein both views display the grouped documents and overrides among the documents;
parsing names of the documents in the file tree;
searching for a designated token in each name;
for each document, collecting all characters following the token in the name into an extension value for the document; and
grouping the documents in the file tree according to their respective extension values.

14. The computer program product of claim 13, further comprising instructors for:
identifying folders in the file tree that contain new documents created between a previous user access to the system and a current user access to the system; and
displaying the folders containing the new documents with a designated color.

15. The computer program product of claim 13, further comprising instructions for:
identifying new documents in the file tree that have been created between previous user access to the system and a current user access to the system; and
displaying the new documents with a designated color.

16. The computer program product of claim 13, further comprising instructions for:
identifying documents in the file tree that have been altered between a previous user access to the system and a current user access to the system; and
displaying the altered documents with a designated color.

17. The computer program product of claim 13, further comprising instructions for grouping the documents in the file tree according to their names.

18. A computer program product for application development, the computer program product comprising:
a computer-readable storage medium having program instructions embodied thereon to perform the steps of:
receiving a number of documents, wherein each document represents a component of an application, and wherein a subset of the documents comprises overrides that link one component to another;
creating a file tree structure for the application from the documents, wherein the file tree structure is organized according to component type;
grouping the documents according to component type and overrides;
displaying the file tree structure to a user according to component type or according to a custom view specified by the user, wherein both views display the grouped documents and overrides among the documents;
identifying documents in the file tree created by an override, wherein the override copies contents of a parent document in the file tree into a child document in the file tree;
displaying the parent document and child document in a designated folder location; and
grouping the parent document according to component type.

19. The method of claim 6, further comprising:
identifying folders in the file tree that contain new documents created between a previous user access to the system and a current user access to the system; and
displaying the folders containing the new documents with a designated color.

20. The method of claim 6, further comprising:
identifying new documents in the file tree that have been created between previous user access to the system and a current user access to the system; and
displaying the new documents with a designated color.

21. The method of claim 6, further comprising:
identifying documents in the file tree that have been altered between a previous user access to the system and a current user access to the system; and
displaying the altered documents with a designated color.

22. The method of claim 6, further comprising grouping the documents in the file tree according to their names.

23. The system of claim 12, wherein the processors further execute instructions to:
identify folders in the file tree that contain new documents created between a previous user access to the system and a current user access to the system; and
display the folders containing the new documents with a designated color.

24. The system of claim 12, wherein the processors further execute instructions to:
identify new documents in the file tree that have been created between previous user access to the system and a current user access to the system; and
display the new documents with a designated color.

25. The system of claim 12, wherein the processors further execute instructions to:
identify documents in the file tree that have been altered between a previous user access to the system and a current user access to the system; and
display the altered documents with a designated color.

26. The system of claim 12, wherein the processors further execute instructions to group the documents in the file tree according to their names.

* * * * *